United States Patent
Marzano et al.

(10) Patent No.: US 11,557,443 B2
(45) Date of Patent: Jan. 17, 2023

(54) DOOR HANDLE COUPLER

(71) Applicant: Rockwell Automation Switzerland GmbH, Aarau (CH)

(72) Inventors: Thomas Strebel Marzano, Aarau (CH); Sadashiv Pimple, Aarau (CH); Dariusz Poczontek, Aarau (CH); Norbert Maschke, Dresden (DE); Andreas Weber, Dresden (DE)

(73) Assignee: Rockwell Automation Switzerland GMBH

( * ) Notice: Subject to any disclaimer, the term of this patent is extended or adjusted under 35 U.S.C. 154(b) by 80 days.

(21) Appl. No.: 16/883,352

(22) Filed: May 26, 2020

(65) Prior Publication Data
US 2021/0375560 A1  Dec. 2, 2021

(51) Int. Cl.
*H01H 9/22* (2006.01)
*H01H 3/54* (2006.01)
*H02K 11/28* (2016.01)
*H01H 9/02* (2006.01)
*H01H 71/56* (2006.01)

(52) U.S. Cl.
CPC ............... *H01H 9/22* (2013.01); *H01H 3/54* (2013.01); *H01H 9/0264* (2013.01); *H02K 11/28* (2016.01); *H01H 2071/565* (2013.01)

(58) Field of Classification Search
None
See application file for complete search history.

(56) References Cited

U.S. PATENT DOCUMENTS

| | | | | | |
|---|---|---|---|---|---|
| 3,657,497 | A | * | 4/1972 | Homberg | H01H 9/282 200/50.05 |
| 6,974,922 | B2 | * | 12/2005 | Bortolloni | H01H 9/22 200/50.05 |
| 7,071,427 | B2 | * | 7/2006 | Houck, III | H01H 9/22 200/50.05 |

(Continued)

OTHER PUBLICATIONS

Allen-Bradley; Rockwell Automation; "Instruction sheet of existing coupler, S-Type"; Publication 140M-IN023A-MU-P—Sep. 2013; www.rockwellautomation.com—(2) pages.

(Continued)

*Primary Examiner* — Felix O Figueroa
(74) *Attorney, Agent, or Firm* — Boyle Fredrickson, SC

(57) ABSTRACT

A coupler between an activator mounted on an enclosure and an electronic protection device located within the enclosure facilitates alignment between the coupler and the electronic protection device during installation and requires no tool for installation. The coupler is positioned over an opening in the electronic protection device and oriented such that a first coupling portion is configured to engage a complementary coupling portion on the electronic protection device. The coupler may be manually mounted, engaging the complementary coupling portions on the door handle coupler and the electronic protection device without requiring a tool for installation. The coupler includes an upper sleeve configured to receive an axle, connected to the activator, that rotates independently of a lower sleeve which is mounted to the electronic protection device, facilitating orientation of the activator on the outside of the enclosure. The coupler provides for local lock-out of the electronic protection device.

20 Claims, 12 Drawing Sheets

(56) References Cited

U.S. PATENT DOCUMENTS

| | | | | |
|---|---|---|---|---|
| 8,420,964 | B2* | 4/2013 | Pearce | H02B 11/127 |
| | | | | 200/50.25 |
| 9,390,868 | B2* | 7/2016 | Clark | H01H 71/56 |
| 9,425,588 | B2* | 8/2016 | Fischer | H02B 1/26 |
| 9,484,163 | B2* | 11/2016 | Oneufer | H01H 9/223 |
| 9,496,101 | B2* | 11/2016 | Oneufer | H01H 9/161 |
| 9,679,733 | B2* | 6/2017 | Dunker | H01H 9/223 |
| 10,181,383 | B2* | 1/2019 | Manahan | H01H 71/56 |
| 10,403,454 | B2* | 9/2019 | Singh | H01H 71/56 |
| 2009/0078549 | A1* | 3/2009 | Gilgen | H01H 9/22 |
| | | | | 200/330 |
| 2014/0346021 | A1 | 11/2014 | Baek | |
| 2015/0053537 | A1 | 2/2015 | Manahan | |
| 2015/0221458 | A1 | 8/2015 | Oneufer et al. | |

OTHER PUBLICATIONS

Allen-Bradley; Rockwell Automation; "Instruction sheet of existing coupler"; Copyright 2013 Rockwell Automation, All Rights Reserved; 21.341.950-04 / Edition 9 / Jan. 2013—(4) pages.
Partial European Search Report dated Oct. 15, 2021; Application No. 21174758.9-1202—(19) pages.
Extended European Search Report dated Jan. 24, 2022; Application No. 21174758.9—(18) pages.

* cited by examiner

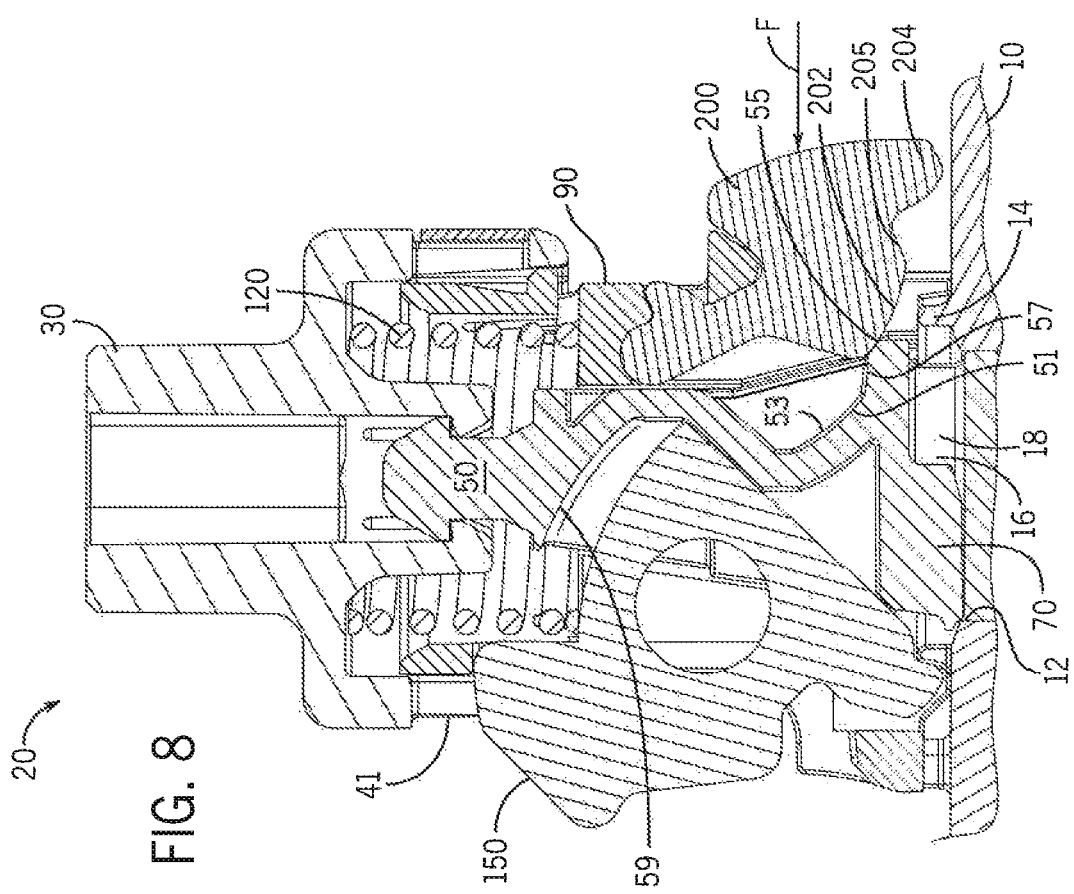

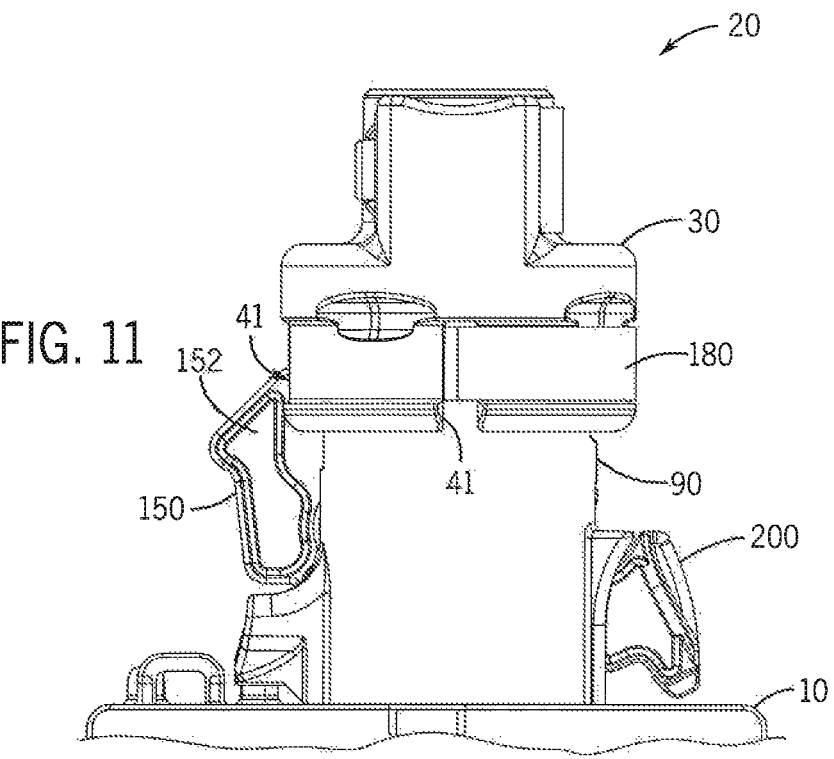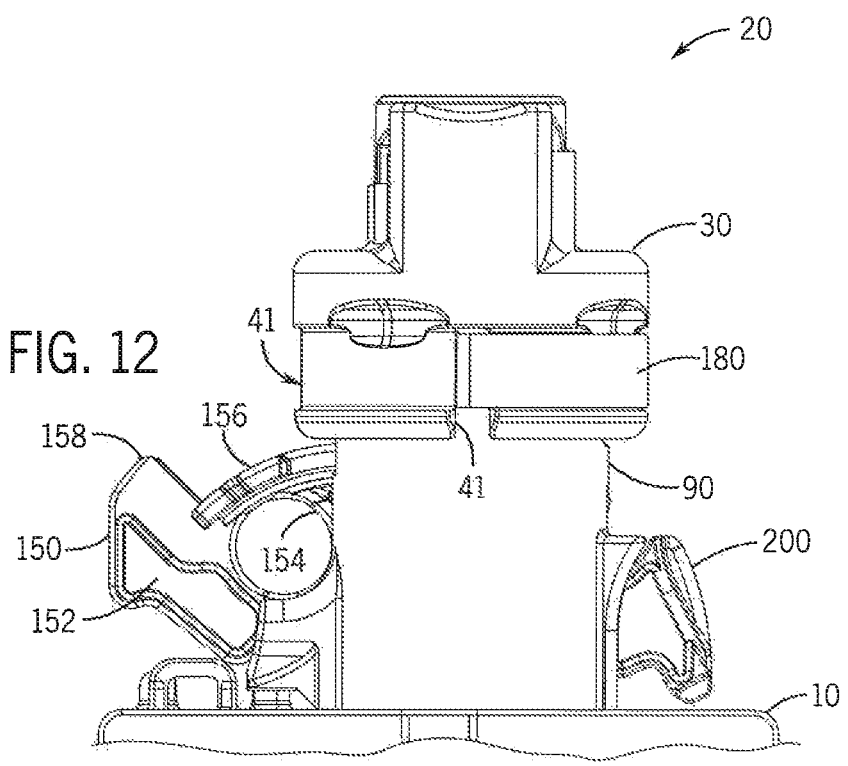

DOOR HANDLE COUPLER

BACKGROUND INFORMATION

The subject matter disclosed herein relates to a coupling member between a circuit breaker and a door activator in an industrial enclosure. More specifically, the coupling member is configured to mount to a front surface of a circuit breaker or disconnect switch mounted within an enclosure and to receive one end of a shaft, where the other end of the shaft is configured to engage an activator such as a door activator mounted on and extending through an outer surface of the enclosure.

As is known to those skilled in the art, power distribution circuits may be used, for example, in industrial control applications to distribute power to various controlled devices. For example, one station along a process line may include multiple controlled axes, where each axis moves in a different direction: up/down, left/right, forward/reverse, and the like. One or more motors and their corresponding motor drives may be provided to supply the driving force for the respective axes. A motor may be coupled via a drive belt, a gear box, a drive screw, direct coupling, or any other suitable method to cause desired motion of a controlled axis. The motor typically receives power from a motor drive which, in turn, receives power from one branch of the power distribution circuit.

Each branch of the power distribution circuit typically includes one or more electrical protection devices. The electrical protection devices may be fuses, circuit breakers, overload relays, switches, disconnects, or a combination thereof. A main disconnect switch may be connected at the top or each branch, with smaller protection devices connected in series or parallel configurations further along each branch and located between individual devices and the top of the branch. The main disconnect switch is sized with a rating sufficient to handle full rated current of each device on the branch and the smaller protection devices are sized with a rating sufficient to handle the rated current of each individual device to which they are connected. For each motor and motor drive, a motor protection circuit breaker may be provided in series to prevent excessive current from being drawn by the motor or motor drive during a fault condition.

The motor protection circuit breakers are commonly located within an industrial enclosure. Locating the motor protection circuit breakers within the enclosure helps prevent inadvertent contact with terminals of these protection devices or of other electrical devices within the enclosure by personnel working around the controlled machine or process. Locating the motor protection circuit breakers within the enclosure also limits exposure to ambient conditions such as rain in an outdoor environment or to contaminants such as metal fragments or cutting fluids in an indoor environment, where the ambient conditions could otherwise produce a short circuit condition between terminals of the protection device.

For many motor protection circuit breakers, it is desirable to have an option to manually activate or deactivate the protection device. The motor protection circuit breaker may include a toggle switch, rotary switch, or the like on the front of the device to allow for manual operation of the device. Locating the motor protection circuit breaker within an enclosure, however, prevents access to the manual switch without opening the enclosure. Opening the enclosure may, however, expose an operator of the device to other electrical circuits that are energized and potentially hazardous.

For safety reasons, external, knife-style disconnect switches with a mechanical lock-out feature are commonly provided external to the enclosure such that a technician opening the enclosure has the opportunity to disconnect power prior to opening an enclosure and accessing devices located within the enclosure and, further, to prevent re-energization of power while the enclosure is open. However, disconnecting power to every device within an enclosure both defeats the purpose of providing manual activation/deactivation for individual protection devices and prevents operation of other equipment powered via the enclosure beyond the particular device which is protected by the particular protection device to be accessed. As a result, means for manually activating/deactivating the protection devices from outside the enclosure are typically provided.

Manual activation of a motor protection circuit breaker housed inside of an enclosure may occur via a switch mounted through an opening on the housing, such as the front door, of the enclosure. The switch includes an actuator member, protruding outward from the enclosure and which may be turned between a first position, disabling the motor protection circuit breaker, and a second position, enabling the motor protection circuit breaker. A first end of a shaft, or axle, is mounted to the actuator member on the inside of the enclosure and extends toward the motor protection circuit breaker. A coupling member is then mounted on the motor protection circuit breaker to receive a second end of the shaft. The shaft transfers the rotary motion from the actuator member along the shaft to the coupling member. The coupling member then transfers the rotary motion to the actuating member on the motor protection circuit breaker to activate or deactivate the circuit breaker.

Existing coupling members are, however, not without certain drawbacks. The coupling members need to be secured to and configured to actuate the motor protection circuit breaker. The coupling member is often positioned over the top of the actuating member for the motor protection circuit breaker, resulting in a blind connection between the coupling member and the motor protection circuit breaker.

Thus, it would be desirable to provide a coupling member that facilitates alignment between the coupling member and the motor protection circuit breaker during installation.

The coupling member must also be securely mounted to the motor protection circuit breaker to ensure that the motor protection circuit breaker is operating consistent with the indication provided by the actuator member external to the enclosure. A tool is required during mounting to engage a fastener, such as a screw, to hold the coupling member to the motor protection circuit breaker. After blindly aligning the fastener from the coupling device with the receptacle on the motor protection circuit breaker, the fastener must be tightened sufficiently to securely mount the coupling device yet not with excessive force that may result in damage to the motor protection circuit breaker. Typically, a torque driver is required, allowing a precise mounting torque to be set to properly secure the coupling device to the motor protection circuit breaker. The torque driver results not only in a tool being required for installation, but a specialized and more expensive driver than, for example, a standard screwdriver.

Thus, it would be desirable to provide a coupling member that allows for tool-less installation to the motor protection circuit breaker.

BRIEF DESCRIPTION

According to a first embodiment of the invention, a coupler for a disconnect switch includes a first member, a second member, and a force transfer member. The first member is configured to engage the disconnect switch, and the first member includes a first coupling portion configured to engage a complementary coupling portion on the disconnect switch to positively retain the coupler to the disconnect switch without using a tool. The second member is configured to receive a shaft, and the second member includes a channel into which the shaft is inserted. The shaft is configured to transfer a rotational force applied to the shaft to the second member when inserted in the channel. The force transfer member is operatively connected between the first member and the second member and is configured to transfer the rotational force from the second member to the first member.

According to another embodiment of the invention, a coupler for a disconnect switch mounted within an enclosure includes an upper sleeve, a lower sleeve, and a locking lever. The upper sleeve is configured to receive a first end of a shaft, and a second end of the shaft is configured to be connected to a door activator mounted on a door of the enclosure. The upper sleeve includes multiple orientation channels. The lower sleeve is configured to be mounted to a surface of the disconnect switch, and the upper sleeve is rotatably mounted to the lower sleeve. The locking lever is pivotally mounted to the lower sleeve and is pivotally moved between a first position and a second position. The locking lever includes an upper segment configured to be inserted into one of the orientation channels when the locking lever is in the first position and configured to be removed from each of the orientation channels when the locking lever is in the second position.

According to still another embodiment of the invention, a coupler for a disconnect switch mounted within an enclosure includes a first member, a second member, and a force transfer member. The first member is configured to engage the disconnect switch. The second member is configured to receive a first end of a shaft, and a second end of the shaft is configured to be connected to a door activator mounted on a door of the enclosure. The second member is configured to receive a rotational force applied to the door activator when the shaft is connected between the door activator and the second member. The force transfer member is selectively connected between the first member and the second member. The force transfer member is configured to transfer the rotational force from the second member to the first member when connected between the first member and the second member, and the force transfer member does not transfer the rotational force from the second member to the first member when not connected between the first member and the second member. The force transfer member includes a lock out opening accessible when the force transfer member is not connected between the first and second members, and the lock out opening is configured to receive a lock hasp extending through the lock out opening to prevent the lock lever from being connected between the first and second members.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 8 is the sectional view of FIG. 5 illustrating a first step of removing the door handle coupler from the motor protection circuit breaker;

FIG. 11 is a side elevation view of the door handle coupler of FIG. 1 illustrating the locking lever in a first position;

FIG. 12 is a side elevation view of the door handle coupler of FIG. 1 illustrating the locking lever in a second position;

Figure 1:
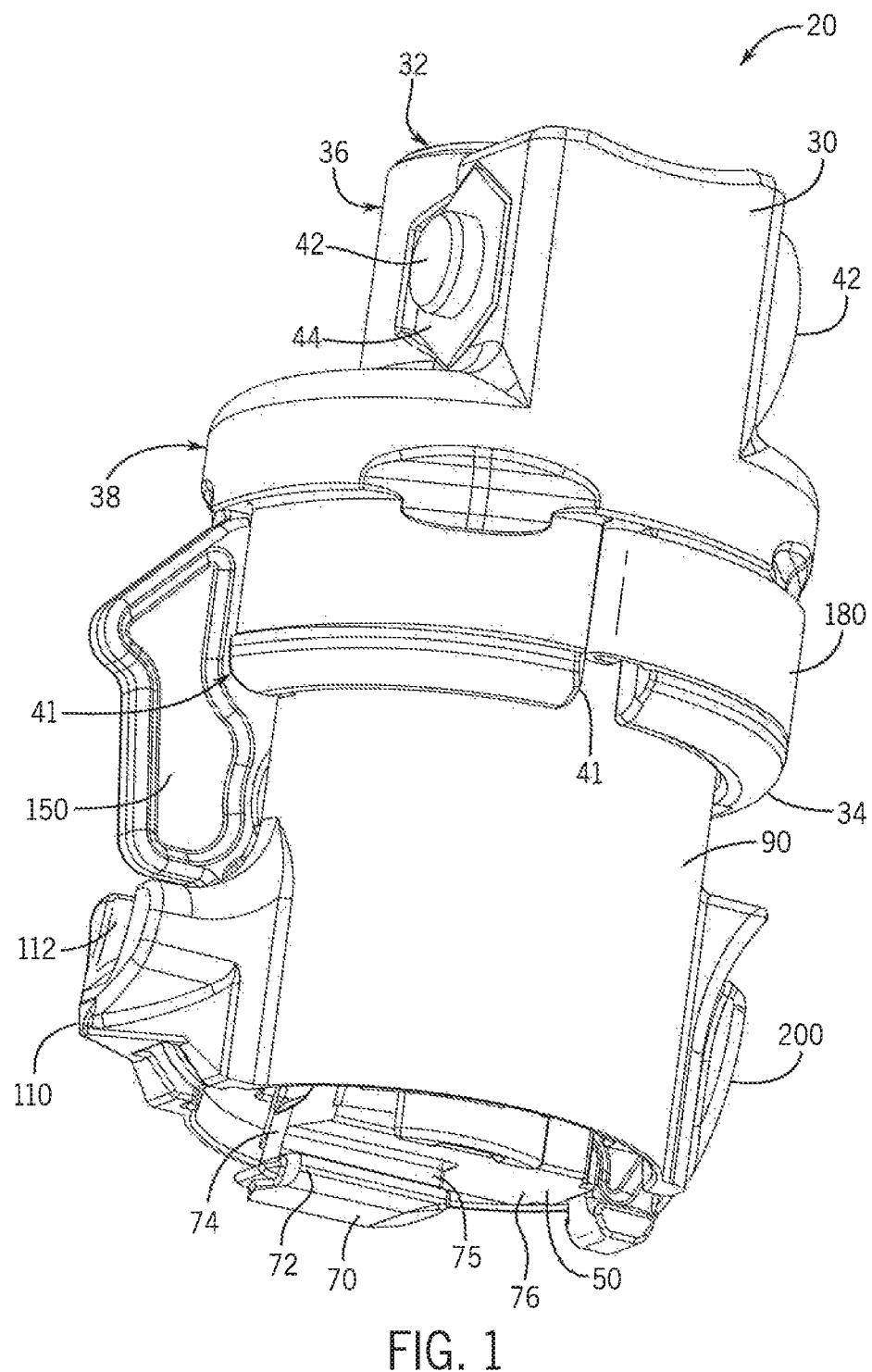
FIG. 1 is a perspective view of one embodiment of a door handle coupler.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a door handle coupler between a door activator and a protection device located in an electric circuit, such as a motor protection circuit breaker. The protection device may be referred to herein as an electronic protection device, an electric protection device, or an electrical protection device. Although the protection device itself may include relay activation, a contact sensor, or the like, the description of electronic, electric, electrical, or the like is not intended to require that the device itself be controlled by the electric circuit but rather is intended to indicate that the protection device is used to selectively create an open circuit or closed circuit condition within an electric circuit. The door handle coupler facilitates alignment between the coupler and the electronic protection device during installation and further requires no tool for installation. The door handle coupler is positioned over an opening in the electronic protection device and oriented such that a coupling portion on the door handle coupler is configured to engage a complementary coupling portion on the electronic protection device. The door handle coupler may be manually mounted to the electronic protection device, engaging the complementary coupling portions on the door handle coupler and the electronic protection device without requiring a tool for installation. A spring inside the door handle coupler applies a biasing force between the coupling portions of the door handle coupler and the electronic protection device to positively retain the door handle coupler to the electronic protection device. A release lever pivotally mounted on the on the door handle coupler may be pressed in to assist in removing the door handle coupler from the electronic protection device. The release lever engages a protrusion from the electronic protection device, such as a rim around the opening, to help disengage the coupling portions on the door handle coupler and the electronic protection device.

According to another aspect of the invention, the door handle coupler facilitates orientation of the door activator on the outside of the enclosure. The door activator is mounted to the outside of the enclosure. Either a portion of the door activator, a first end of an axle mounted to the door activator from the inside of the enclosure, or a combination thereof extend through the door to an interior of the enclosure. The second end of the axle is mounted to the door handle coupler to transfer the force applied to the door activator to the electronic protection device and thereby enable or disable the device. The axle may include, for example, an asymmetrical cross section, an alignment tab, or the like to ensure that the axle is inserted into either the door activator, the door handle coupler, or into both devices in a predefined orientation. The electronic protection device, the enclosure in which the electronic protection device, or a combination thereof may, however, be mounted in an orientation such that the door activator when connected via the axle to the door handle coupler is in an undesirable orientation. In certain applications, it may be required that a selection of "Off" for the electronic protection device require the door activator to be in a first orientation and that a selection for "On" for the electronic device require the door activator to be in a second orientation. If one of the components from the enclosure to the protection device or the coupler is not mounted properly, the resulting orientation of the door activator when connected via the axle may be improper. The door handle coupler described herein includes an upper sleeve, configured to receive the axle, that rotates independently of a lower sleeve, configured to be mounted to the electronic protection device. A locking lever secures the upper and lower sleeve in a first position to transfer the force from the door activator between the upper and lower sleeves, and the locking lever allows the upper sleeve to rotate with respect to the lower sleeve when the locking lever is in a second position. The door activator is first mounted in a desired orientation. The locking lever may be manually pivoted from the first position to the second position without the use of a tool to allow the axle and the door handle coupler to be properly oriented with respect to the door activator. Once the upper sleeve is properly oriented with respect to the door activator, the locking lever may be pivoted back to the first position to secure the upper and lower sleeves in the proper orientation.

According to still another aspect of the invention, the door handle coupler provides for a lock-out feature on the electronic protection device to which it is mounted. Typically, lock-out of an electronic protection device occurs external to an enclosure in which it is mounted. While the door activator must be disconnected from the axle in order to open the door, the axle remains mounted within the door handle coupler which is, in turn connected to the electronic protection device. In some instances, there may be no lock-out provided, rather relying on removal of the door activator from the axle to prevent rotation of the axle. While the enclosure is open, however, the potential exists for the axle to be rotated and inadvertently causing power to be provided to a device being protected by the protection device. The locking lever includes a lock-out opening extending through the lever, where the lock-out opening is accessible when the locking lever is in the second position, discussed above, and the lock-out opening is inaccessible when the locking lever is in the first position, also discussed above. As a result, the locking lever may be pivoted out to the second position, preventing activation of the electronic protection device by the axle, and a lock may be inserted through the lock-out opening to prevent the locking lever from being pivoted back to the first position, providing a local lock-out feature at the electronic protection device.

Figure 2:
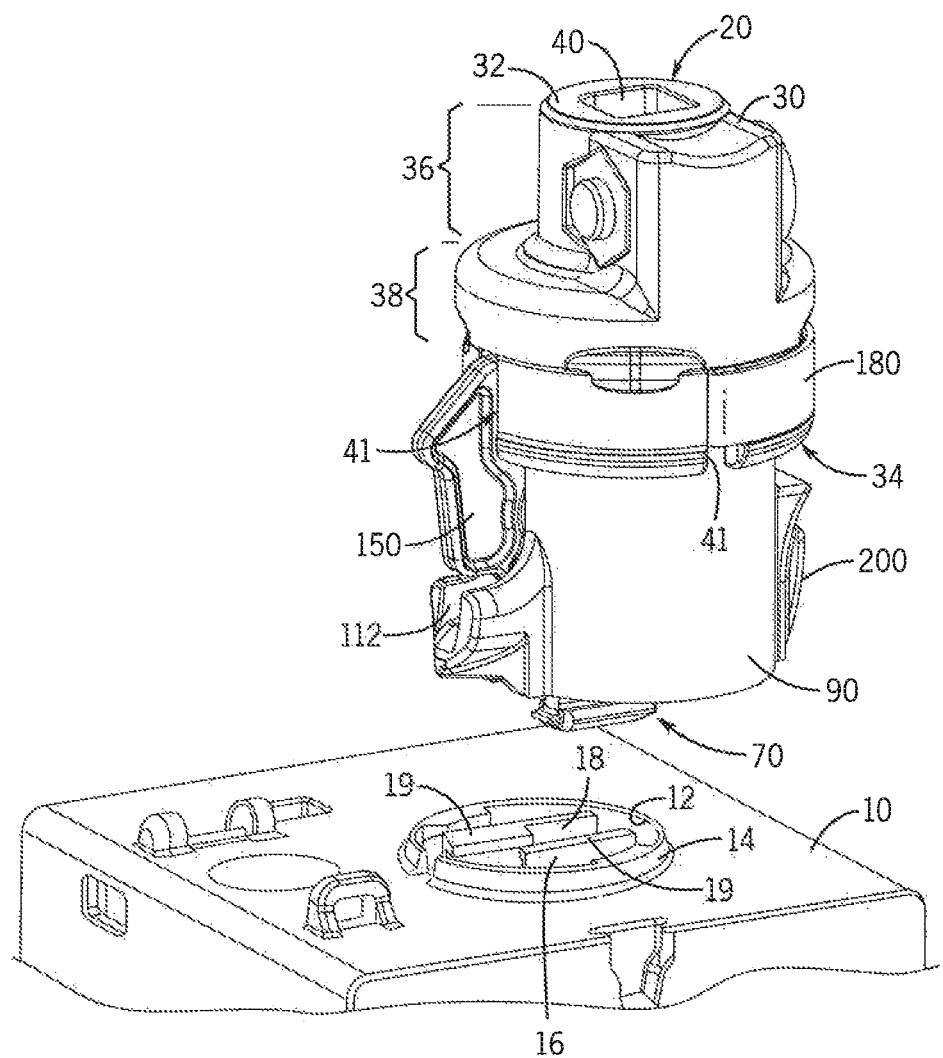
FIG. 2 is another perspective view of the door handle coupler of FIG. 1 and an exemplary motor protection circuit breaker to which the door handle coupler may be mounted.

Turning initially to FIGS. 1-2, an exemplary embodiment of a door handle coupler 20 is illustrated. The door handle coupler 20 includes an upper sleeve 30 and a lower sleeve 90. The upper sleeve 30 includes a top surface 32 and a bottom surface 34, the bottom surface opposite the top surface. The upper sleeve 30 is generally cylindrical in form with a first portion 36 of the upper sleeve 30 having a first diameter and a second portion 38 of the upper sleeve 30 having a second diameter. The first portion 36 of the upper sleeve 30 is proximate the top surface 32, the second portion 38 of the upper sleeve 30 is proximate the bottom surface 34, and the second diameter is greater than the first diameter. A channel 40 extends from the top surface 32 into the upper sleeve 30 and is configured to receive one end of a shaft, or axle, (not shown). The opposite end of the shaft is connected to a door actuator on the front of an enclosure in which the door handle coupler 20 is located.

When the door actuator is rotated, a rotational force is applied to the shaft. The channel 40 may have, for example, a square, hexagonal, or other polygonal cross-section, such that the rotational force applied to the shaft is transferred to the upper sleeve 30. Optionally, the channel 40 may be cylindrical and a fastening member may positively retain the shaft in the channel and prevent rotation of the shaft within the channel. Consequently, if the channel has a cylindrical cross-section, the fastening member, in combination with the shaft, transfers the rotational force from the door actuator to the upper sleeve 30. Even if the shaft has a polygonal cross-section, a fastening member may be used to positively retain the shaft within the channel. According to the illustrated embodiment, a threaded fastener 42, such as a screw or bolt, extends through a pair of openings, where each opening is generally parallel to a center axis of the channel. A bolt 44 fits on the end of the threaded fastener and the threaded fastener is rotated within the bolt 44 until the bolt 44 secures the threaded fastener to the upper sleeve 30. It is contemplated that the shaft may include an opening configured to align with the openings in the upper sleeve 30 and the bolt 44 may also pass through the shaft, thereby positively retaining the shaft within the channel 40 of the upper sleeve. Optionally, an outer surface of the shaft may include a detent within which a portion of the bolt 44 fits, again positively retaining the shaft within the channel 40. According to still another embodiment, a clamping mechanism may be incorporated within or integrally formed by the upper sleeve 30, wherein as the bolt 44 is tightened against the upper sleeve 30, the clamping mechanism is tightened against the shaft, positively retaining the shaft within the channel 40.

Figure 4:
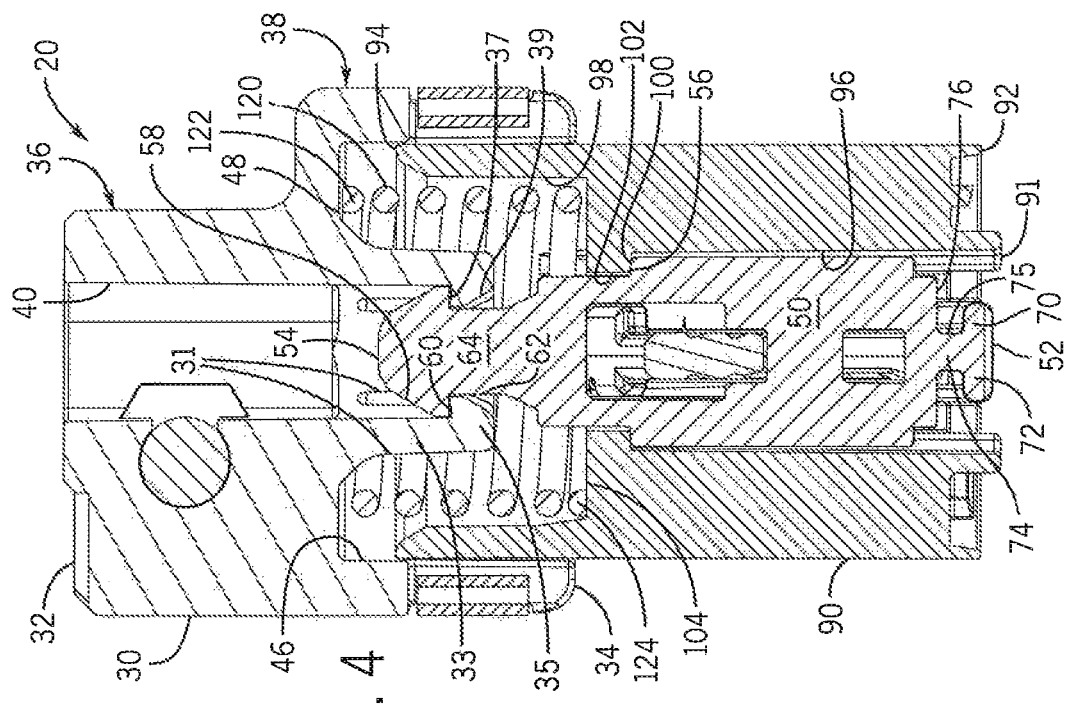
FIG. 4 is a sectional view of the door handle coupler of FIG. 3 taken at 4-4.
Figure 3:
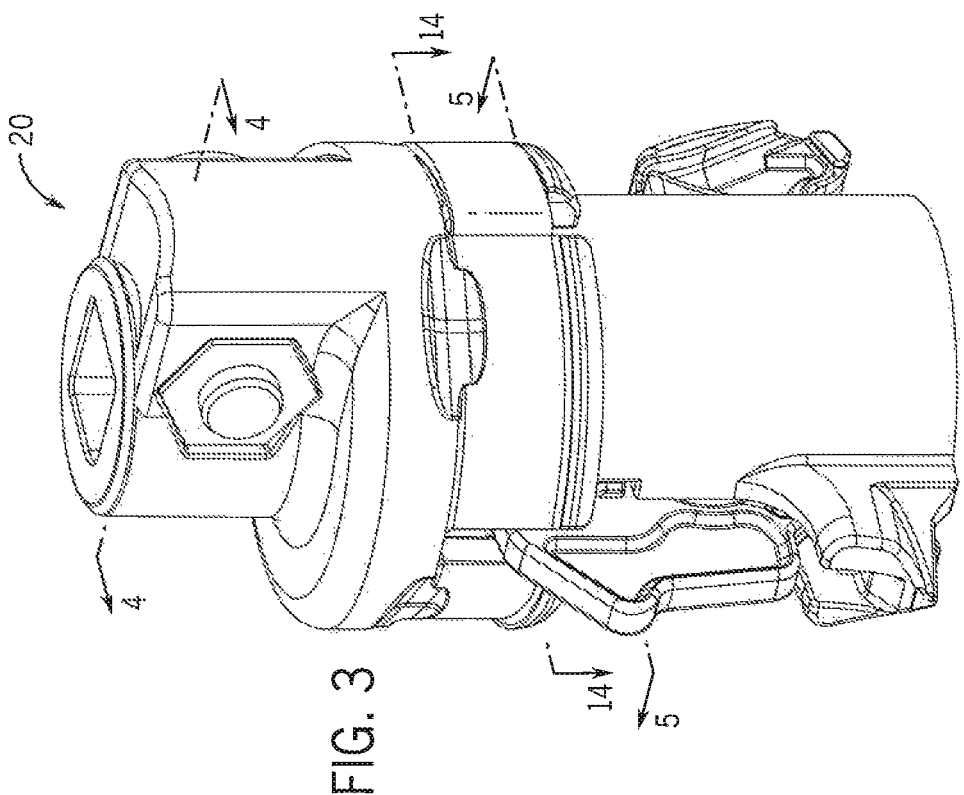
FIG. 3 is still another perspective view of the door handle coupler illustrating the orientation of different sectional views.

With reference also to FIG. 4, the lower sleeve 90 includes a first end 92 and a second end 94, the second end being opposite the first end. The lower sleeve 90 is generally cylindrical in shape with one or more openings extending through the sleeve 90 and/or one or more protrusions extending from the sleeve as will be discussed in more detail below. The first end 92 includes an opening 91 to a channel 96 extending from the first end 92 of the lower sleeve 90 through a portion of the length of the lower sleeve 90. The second end 94 is generally open with a rim extending around the periphery of the second end. A spring chamber 98 is located at the second end 94, extending for a portion of the length of the lower sleeve 90. A stop 100 is defined between the channel 96 and the spring chamber 98, where the stop 100 protrudes into the channel 96 for a portion of the diameter of the channel but includes an opening 102 extending through the middle of the stop.

The upper sleeve 30 is rotatably mounted to the lower sleeve 90 via a coupling member 50. The coupling member 50 is inserted through the opening 91 in the lower sleeve 90 and extends through the lower sleeve 90 via the channel 96 and into the spring chamber 98 present in the lower sleeve. A shoulder 56 on the coupling member 50 is configured to engage the stop 100 on the lower sleeve 90 and prevent the coupling member from being inserted further into the lower sleeve 90. The coupling member 50 has a first end 52 and a second end 54, the second end opposite the first end. When the coupling member 50 is inserted into the lower sleeve 90, the first end 52 of the coupling member is proximate the first end 92 of the lower sleeve, and the second end 54 of the coupling member is inserted into the spring chamber 98. The diameter of the coupling member 50 is greater along the portion of the coupling member to be inserted within the channel 96 than the portion of the coupling member extending through the opening 102 in the stop 100. A generally planar surface, orthogonal to the outer periphery of the coupling member is defined between the two portions of the coupling member. This generally planar surface defines the shoulder 56 of the coupling member and is configured to engage a generally planar surface on the lower side of the stop 100. The two generally planar surfaces prevent the coupling member 50 from being inserted further into the lower sleeve 90 while also allowing the coupling member 50 to rotate within the channel 96 with respect to the lower sleeve 90.

The coupling member 50 is used to positively retain the upper sleeve 30 to the lower sleeve 90. The second end 54 of the coupling member 50 is generally planar. Optionally, the second end 54 may be rounded or even come generally to a point defined by a conical periphery. A first portion 58 of the outer periphery of the coupling member 50 first extends in a conical manner from the second end 54 with the diameter of the coupling member 50 increasing from the second end 54 toward the first end 52 for the length of the first portion 58. At the end of the first portion 58, a retaining lip 60 is defined. The retaining lip 60 extends generally orthogonal to a center axis of the coupling member from the outer periphery of the first portion 58 to an outer periphery 62 of a stem portion 64 of the coupling member 50, where the diameter of the outer periphery 62 of the stem portion 64 is less than the diameter of the first portion 58, defining the retaining lip 60 extending around the periphery of the coupling member 50.

The retaining lip 60 is configured to positively retain one or more tabs 31 on the upper sleeve 30. Each tab 31 is located on the lower portion of the channel 40 within the upper sleeve 30. A channel separates each tab 31 and, in the illustrated embodiment, the upper sleeve 30 includes four tabs 31, with each tab 31 and one channel between adjacent tabs spanning a ninety-degree arcuate length around the periphery of the coupling member 50. Each tab 31 first includes an elongated portion 33 configured to extend from the bottom of the channel 40 beyond the second end 54 and past the retaining lip 60 of the coupling member 50, when the upper sleeve 30 engages the coupling member 50. A distal end 35 of each tab 31 includes a sloped surface 39 and a retaining surface 37. The retaining surface 37 is generally planar, extends around the inner periphery of each tab 31 into the channel 40 and is generally orthogonal to the elongated portion 33. The sloped surface 39 begins at the inner periphery of the retaining surface and slopes outward for a distance approximately equal to the distance the retaining surface extends inward into the channel 40. The upper sleeve 30 is made of a resilient material such that each tab 31 may be deflected outward as the sloped surface 39 of each tab 31 engages the conical surface 58 of the coupling member 50 and which returns to its original position once the sloped surface 39 of each tab 31 extends beyond the first portion 58 of the coupling member 50.

During assembly, the upper sleeve 30 and the lower sleeve 90 are arranged with a spring 120 between the two sleeves. As the coupling member is inserted into the lower sleeve 90 and engages the upper sleeve 30, the spring 120 is compressed, resulting in a loading force between the upper sleeve 30 and the lower sleeve 90, where the loading force wants to separate the two sleeves. A first spring seat 48 is integrally formed in the upper sleeve 30 between the tabs 31 extending downward in the central portion of the upper sleeve and the outer periphery of the upper sleeve 30. According to the illustrated embodiment, the first spring seat 48 is located in a chamber 46 within the second portion 38 of the upper sleeve 30. Each tab 31 extends downward from the first portion in the interior of the upper sleeve 30 defining the end of the channel 40 in which the shaft is inserted. The chamber 46 exists between the outer periphery of each tab 31 and an inner periphery of the outer walls of the upper sleeve 30. The chamber 46 is configured to receive the spring 120 and the upper surface of the chamber defines the first spring seat 48. A second spring seat 104 is integrally formed in the spring chamber 98 of the lower sleeve 90. The spring chamber 98 is a generally open space defined by an outer wall of the lower sleeve 90 for the distance beyond the opening 102 in the middle of the stop 100 to the second end 94 of the lower sleeve. A generally planar surface oriented orthogonal to a center axis of the lower sleeve 90 extending between the opening 102 and an outer wall of the lower sleeve defines the second spring seat 104.

The upper sleeve 30 and lower sleeve 90 are positively retained by the coupling member 50 being press-fit through the lower sleeve 90 and into the upper sleeve 30. To assemble the upper sleeve 30 to the lower sleeve 90, a second end 124 of the spring 120 is placed on the second spring seat 104 and the upper sleeve 30 is placed over the spring 120 such that the first end of the spring 120 engages the first spring seat 48. The coupling member 50 is inserted into the channel 96 of the lower sleeve 90 and a force is applied to either the upper sleeve 30, lower sleeve 90, or a combination thereof compressing the spring 120. The coupling member 50 is then press fit into the upper sleeve 30. The second end 54 of the coupling member 50 passes through the opening 102 in the middle of lower sleeve 90 and passes through the interior of the spring 120 until it engages the tabs 31 on the upper sleeve 30. The conical surface of the first portion 58 of the coupling member 50 engages the sloped surface 39 of each tab 31 of the upper sleeve 30. The channels between each tab 31 allow outward deflection of the tabs 31 as the second end 54 of the coupling member 50 is inserted between the tabs 31. Once the conical portion 58 of the coupling member 50 is inserted beyond the retaining surface 37 of each tab 31, the tabs 31 return to their original position. The retaining surface 37 of each tab 31 is then located below the retaining lip 60 of the coupling member. The force applied to the upper sleeve 30, lower sleeve 90, or combination thereof to compress the spring 120 is released, allowing the spring to apply the loading force to the upper and lower sleeves. The loading force acts against the first spring seat 48 and the second spring seat 104 in opposing directions. The loading force applied in opposite directions to the upper sleeve 30 and to the lower sleeve 90 cause the retaining surface 37 of each tab 31 to be securely seated against the retaining lip 60 of the coupling member 50, thereby holding the upper sleeve 30 to the lower sleeve 90. At the same time, the retaining lip 60 of the coupling member extends around the outer periphery 62 of the stem portion 64 such that the upper sleeve 30 may freely rotate with respect to the lower sleeve 90. As the upper sleeve 30 rotates, the retaining surface 37 of each tab 31 slides along the retaining lip 60 and the first end 122 of the spring 120 slides along the first spring seat 48.

Figure 5:
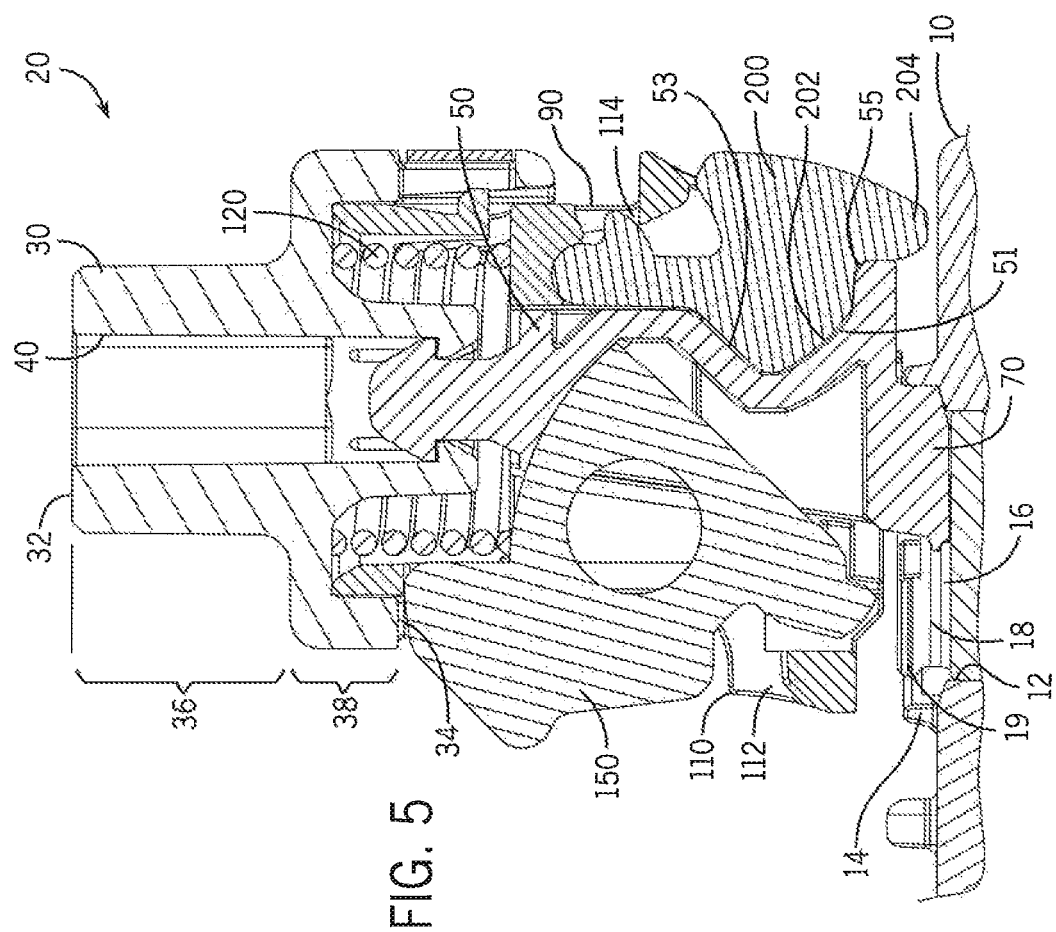
FIG. 5 is a sectional view of the door handle coupler of FIG. 3 taken at 5-5 inclusive of a partial sectional view of the exemplary motor protection circuit breaker and further illustrating a first step of exocentric mounting the door handle coupler to the motor protection circuit breaker.

Referring next to FIGS. 1 and 5, the door handle coupler 20 includes two levers pivotally mounted to the lower sleeve 90. A first lever, referred to herein as a locking lever, 150 is mounted on one side of the lower sleeve 90, and a second lever, referred to herein as a release lever, 200 is mounted to the other side of the lower sleeve 90. A boss 110 protruding from the side and proximate the first end 92 of the lower sleeve 90 includes a channel 112 in which the locking lever 150 is mounted. The channel 112 extends through the side of the lower sleeve 90 such that the locking lever 150 may be pivoted into the lower sleeve 90 in a first position and pivoted away from and primarily outside of the lower sleeve 90 in a second position. The locking lever 150 serves as a force transfer member between the upper sleeve 30 and the lower sleeve 90, allowing rotational force applied to the upper sleeve 30 to be transferred to the lower sleeve 90 when the locking lever 150 is pivoted into the lower sleeve 90 in the first position but preventing rotational force applied to the upper sleeve 30 from being transferred to the lower sleeve 90 when the locking lever 150 is pivoted outward from the lower sleeve 90 in the second position. Operation of the locking lever 150 is discussed in more detail below.

The release lever 200 is pivotally mounted within a second channel 114 located on an opposite side of the lower sleeve 90. In a first position, the release lever 200 engages the coupling member 50 inside the door handle coupler 20, pulling the coupling member 50 and the upper sleeve 30 downward against the lower sleeve 90, compressing the spring 120 within the door handle coupler, and causing the first end 52 of the coupling member 50 to extend downward beyond the first end 92 of the lower sleeve 90. In a second position, the release lever 200 disengages the coupling member 50, allowing the force from the spring 120 to extend the lower sleeve 90 downward around the coupling member 50. Operation of the release lever 200 is discussed in more detail below.

Figure 6:
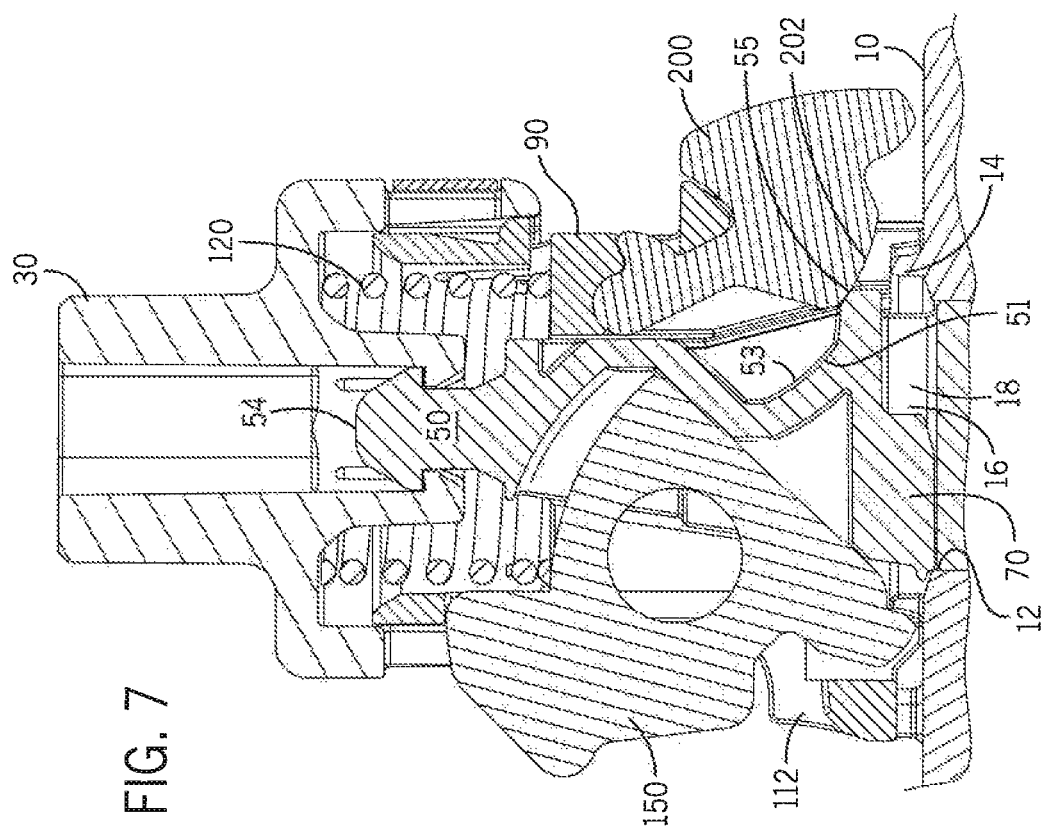
FIG. 6 is the sectional view of FIG. 5 illustrating a second step of mounting the door handle coupler to the motor protection circuit breaker.
Figure 7:
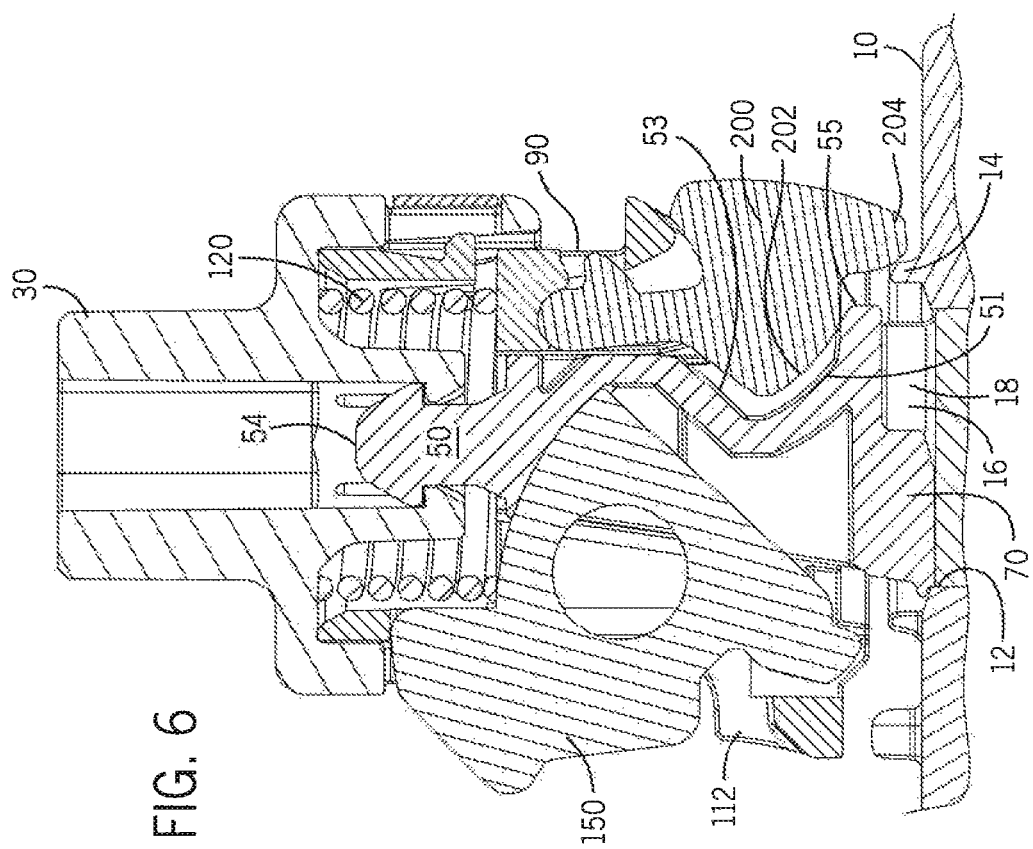
FIG. 7 is the sectional view of FIG. 5 illustrating a third step of mounting the door handle coupler to the motor protection circuit breaker.
Figure 15:
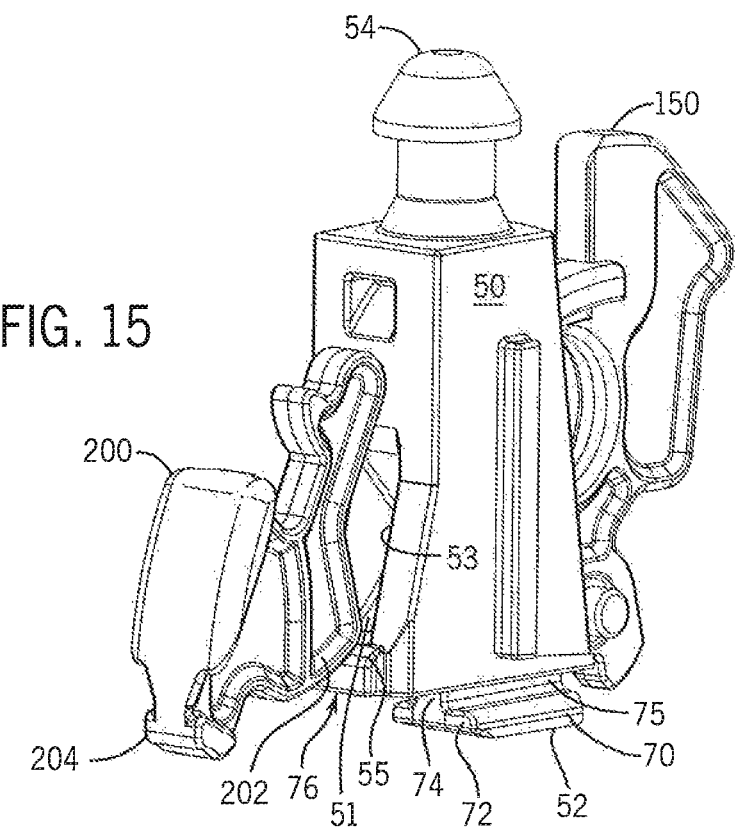
FIG. 15 is a first perspective view of the coupling member, locking lever, and release lever for the door handle coupler of FIG. 1.
Figure 16:
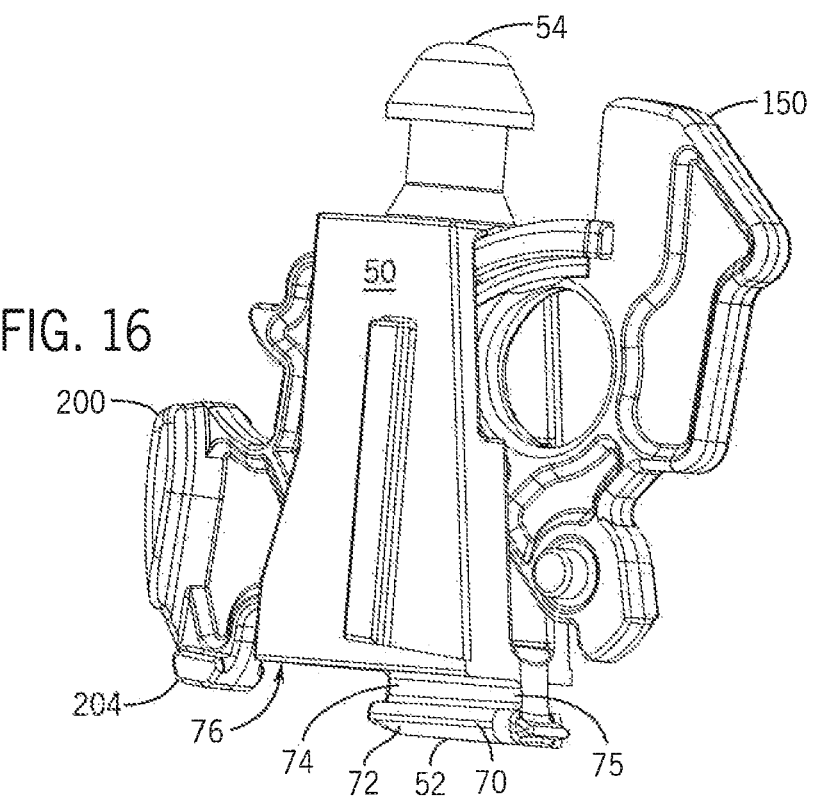
FIG. 16 another perspective view of the coupling member, locking lever, and release lever for the door handle coupler of FIG. 1.

In operation, the release lever 200 facilitates tool-less mounting of the door handle coupler 20 with an electronic protection device 10. According to the embodiment illustrated in FIG. 2, the door handle coupler 20 is shown being installed on a motor protection circuit breaker. With reference also to FIGS. 5-7, multiple steps in the process of mounting the door handle coupler 20 to the motor protection circuit breaker 10 are shown. In FIG. 5, the release lever 200 is located in the first position and engages the coupling member 50. A cam 202 located along the inner edge of the release lever 200 engages a sloped surface 51 of a channel 53 within the coupling member 50 (see also FIG. 15). The channel 53 within the coupling member 50 is generally aligned with the second channel 114 of the lower sleeve 90 allowing the release lever 200 to pivot within both channels. When the cam 202 engages a lower edge 55 of the sloped surface 51 as the release lever 200 is pivoted into the first position, the cam 202 draws the coupling member 50 downward. The retaining lip 60 of the coupling member 50, in turn, applies a downward force on the retaining surface 37 of the upper sleeve 30. As the upper sleeve 30 is drawn downward, the spring 120 is compressed further between the first spring seat 48 of the upper sleeve 30 and the second spring seat 104 of the lower sleeve 90. The release lever 200 continues to draw the coupling member 50 downward until a coupling portion 70 integrally formed at the first end 52 of the coupling member 50 extends below the first end 92 of the lower sleeve 90.

With reference again to FIGS. 1 and 2, the door handle coupler 20 is positioned over an opening 12 in the upper surface of the motor protection circuit breaker 10. The coupling portion 70 is aligned with a complementary coupling portion 16 in the motor protection circuit breaker 10. The illustrated coupling portion 70 on the coupling member 50 is an elongated T-shaped member. Optionally, the coupling member 50 may be L-shaped, H-shaped, or take any other sectional form where the coupling portion 70 on the coupling member 50 is configured to engage the complementary coupling portion 16. The lower segment 72 of the coupling portion 70 has a width greater than the upper segment 74 of the coupling portion. A channel 75 is formed on each side of the coupling portion 70 between the corresponding upper surface of the lower segment 72 the side surface of the upper segment 74 and a mating surface 76 on the bottom of the coupling member 50. Each channel 75 is configured to engage a rail 19 along the top of a channel 18 within the complementary coupling portion 16. The rails 19 along the top of the channel 18 extend for only a portion of the length of the channel 18 and the remainder of the length of the channel is open to receive the coupling portion 70 of the coupling member 50. The coupling portion 70 is aligned over the open segment of the channel 18 on the complementary coupling portion 16 and the door handle coupler 20 is moved downward until the lower segment 72 of the coupling portion 70 is located within the channel 18 as shown in FIG. 5. The door handle coupler 20 is then slid forward such that the lower segment 72 of the coupling portion 70 slides below the rails 19 of the complementary coupling portion 16. In turn, each rail 19 slides within a channel 75 on one side of the coupling portion 70.

With reference next to FIGS. 6 and 7, as the door handle coupler 20 is slid forward, a lower foot 204 of the release lever 200 engages a rim 14 extending around a periphery of the opening 12 in the motor protection circuit breaker 10. The rim 14 engages the lower foot 204 causing the release lever 200 to begin pivoting out of the coupling member 50. The cam 202 is drawn out of the channel 53 in the coupling member a sufficient distance, such that the cam 202 is located over the lower edge 55 of the channel 53 and no longer drawing the coupling member 50 downward. A force resulting from compression of the spring 120 causes the upper sleeve 30 and the lower sleeve 90 to begin separating from each other. The coupling portion 70 of the coupling member 50 is retained within the complementary coupling portion 16 on the motor protection circuit breaker 10, preventing the coupling member 50 from being drawn upward. Similarly, the retaining lip 60 of the coupling member 50 remains engaged with the retaining surface 37 of the upper sleeve 30 and prevents the upper sleeve 30 from moving away from the motor protection circuit breaker 10. The biasing force applied by the spring 120, therefore, causes the lower sleeve 90 to move downward away from the upper sleeve 30. As seen in FIG. 7, the opening 91 on the lower surface 92 of the lower sleeve 90 has a sufficient diameter to receive the rim 14 within the bottom of the lower sleeve 90. The first end 92 of the lower sleeve 90 engages an upper surface of the motor protection circuit breaker 10 preventing further separation between the upper sleeve 30 and the lower sleeve 90. The biasing force from the remaining compression in the spring 120 draws the lower segment 72 of the coupling portion 70 against the rails 19 of the complementary coupling portion 16 and presses the lower surface 92 of the lower sleeve against an upper surface of the motor protection circuit breaker 10, positively retaining the door handle coupler 20 to the motor protection circuit breaker.

According to another aspect of the invention, the opening 91 on the lower surface 92 of the lower sleeve 90 may be configured to align the door handle coupler 20 with the opening 12 on the motor protection circuit breaker 10. The inner periphery of the opening 91 may have a diameter sized to receive the rim 14 within the opening 91. Further, the rim 14 may be tapered, with a greater thickness at the base of the rim 14, proximate the upper surface of the motor protection circuit breaker 10, and a lesser thickness at the upper surface of the rim 14, creating a sloped outer periphery of the rim 14. The inner periphery of the opening 91 may similarly be sloped to engage the outer periphery of the rim 14 and position the door handle coupler 20 over the opening 12 as the lower sleeve 90 is forced downward by the spring 120 during the installation process.

Figure 10:
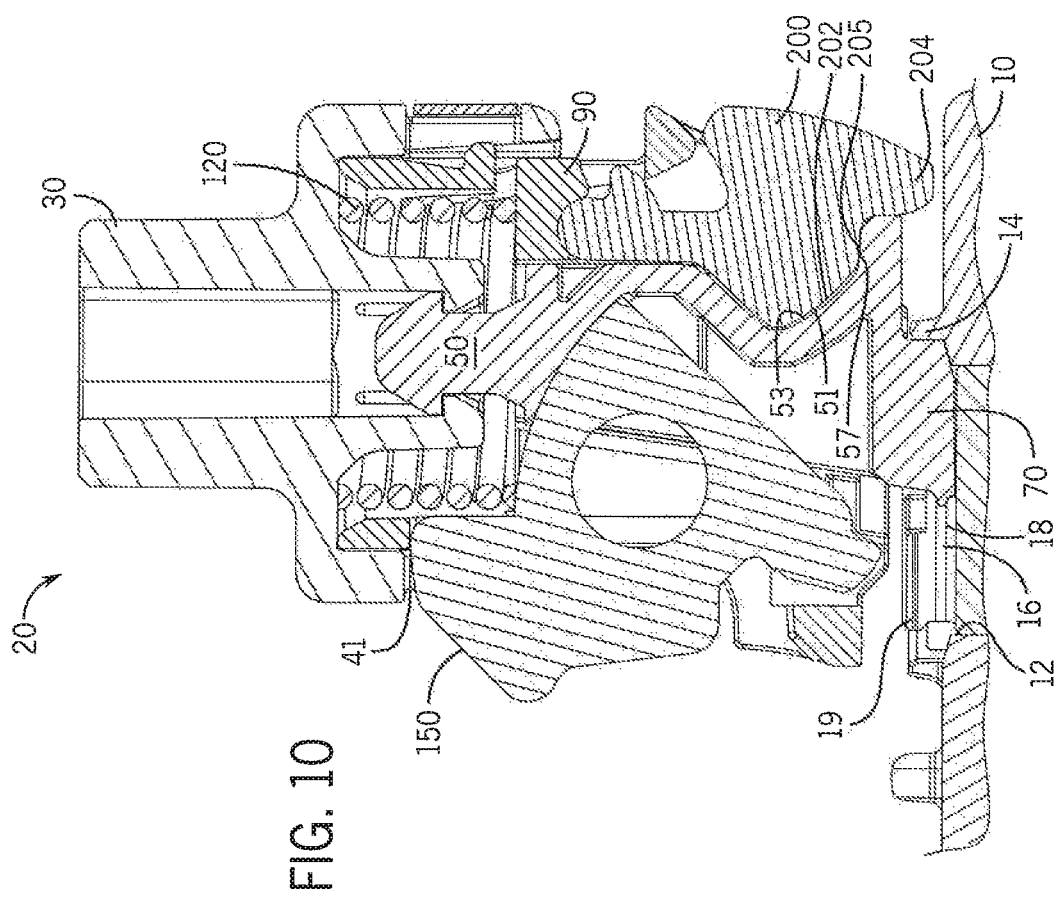
FIG. 10 is the sectional view of FIG. 5 illustrating a third step of removing the door handle coupler from the motor protection circuit breaker.
Figure 9:
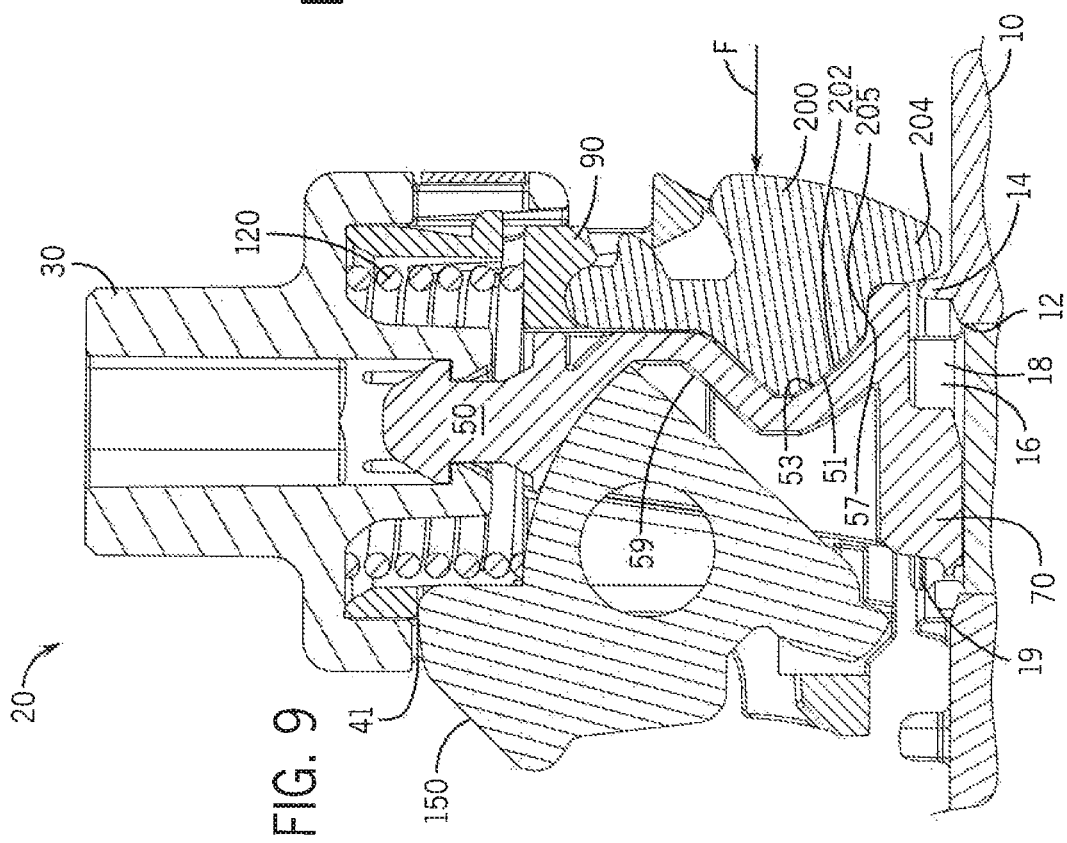
FIG. 9 is the sectional view of FIG. 5 illustrating a second step of removing the door handle coupler from the motor protection circuit breaker.
Figure 13:
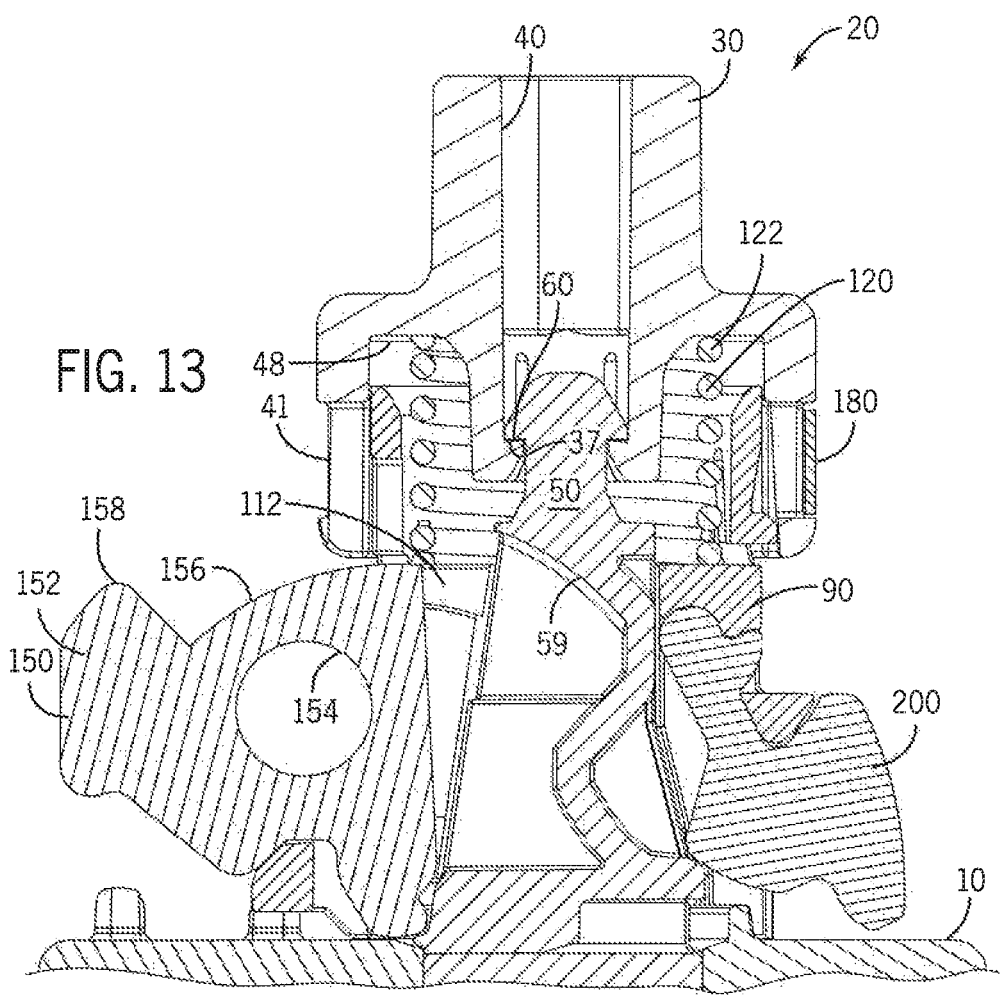
FIG. 13 is a sectional view of the door handle coupler of FIG. 3 taken at 5-5 with the locking lever in the second position.
Figure 14:
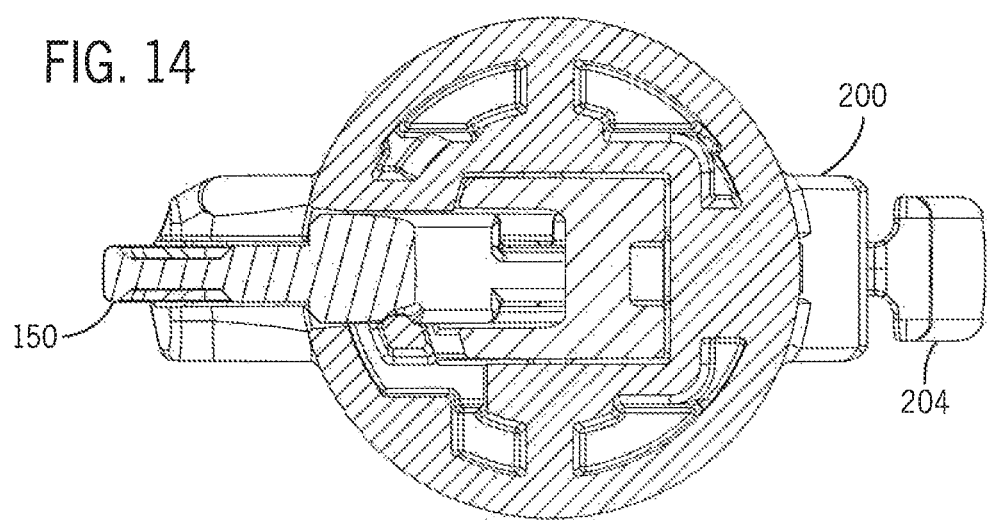
FIG. 14 is a sectional view of the door handle coupler of FIG. 3 taken at 14-14 with the locking lever in the first position.

When the door handle coupler 20 is mounted to the motor protection circuit breaker 10, the release lever 200 may be used to help disconnect the door handle coupler 20. With reference next to FIGS. 8-10, steps in the sequence for disconnecting the door handle coupler 20 from the motor protection circuit breaker 10 are illustrated. A force, F, is applied to the release lever 200 causing the release lever to pivot inward. As the release lever 200 moves inward to the second channel 114 of the lower sleeve 90 and into the channel 53 on the coupling member 50, the cam 202 engages the lower edge 55 of the sloped surface 51 in the coupling member 50. Because the coupling member 50 is mounted to the motor protection circuit breaker 10, it remains in a fixed position. The release lever 200 is, however, pivotally mounted to the lower sleeve 90. As the cam 202 passes over the lower edge 55, it forces the lower sleeve 90 to move upward with respect to the coupling member 50, compressing the spring 120 and lifting the first end 92 of the lower sleeve above the rim 14 of the opening 12 on the motor protection circuit breaker 10. The release lever 200 may be pivoted fully into the coupling member 50, as shown in FIG. 9, until the cam 202 again engages the sloped surface 51 of the coupling member 50 and a flat surface 205 of the cam 202 engages an opposing flat segment 57 within the channel 53 of the coupling member 50. The force from the compressed spring 120 pushes the flat surface 205 of the cam 202 against the flat segment 57 of the coupling member 50, retaining the release lever 200 within the channel 53 on the coupling member 50. The release lever 200 also maintains compression on the spring 120 and keeps the lower sleeve 90 raised above the rim 14 of the opening 12.

Once the lower sleeve 90 has been raised above the rim 14 of the opening 12, the door handle coupler 20 may be removed from the motor protection circuit breaker 10. The door handle coupler is moved laterally such that the lower segment 72 of the coupling portion 70 slides out from under the rails 19 along the channel 18. When the door handle coupler 20 has moved a sufficient distance such that the lower segment 72 of the coupling portion 70 is no longer retained by the rails 19 along the channel 18, the door handle coupler 20 may be lifted away from the motor protection circuit breaker 10. As a result, the door handle coupler 20 may be removed from the motor protection circuit breaker 10 without requiring a tool for removal.

Turning next to FIGS. 11-14 and 17-18, operation of the locking lever 150 will be discussed. The locking lever 150 allows for a selective transfer of force between the upper sleeve 30 and the lower sleeve 90. In FIG. 11, the locking lever 150 is illustrated in a first position with a lower segment 156 of the lever pivoted fully into the first channel 112 of the lower sleeve 90 and into a channel 59 within the coupling member 50. An upper segment 158 of the locking lever 150 is located within one of multiple orientation channels 41 in the upper sleeve 30. In FIG. 12, the locking lever 150 is illustrated in a second position with the lower segment 156 of the lever pivoted, at least in part, out of the channels 59, 112 in the coupling member 50 and lower sleeve 90, respectively. The upper segment 158 of the locking lever 150 is also pivoted out of the orientation channel 41 in the upper sleeve 30. The locking lever 150 includes a handle portion 152 which remains external to the lower sleeve 90 in both the first and second positions allowing a technician to manually pivot the locking lever 150 between the two positions.

In the first position, illustrated in FIG. 11, the locking lever 150 serves as a force transfer member between the upper sleeve 30 and the lower sleeve 90. A rotational force may be applied to a door activator which is accessible externally to the enclosure in which the motor protection circuit breaker 10 is mounted in order to switch the motor protection circuit breaker between on and off. A first end of a shaft is mounted to the door activator and a second end of the shaft is inserted into the channel 40 of the upper sleeve 30. The force is transferred via the shaft to the upper sleeve 30 of the door handle coupler 20. With the locking lever 150 in the first position, rotational motion of the upper sleeve 30 engages the upper segment 158 of the locking lever which is inserted within one of the orientation channels 41. The locking lever 150 is a rigid body and transfers the rotational motion to the lower sleeve 90 and to the coupling member 50 via the lower segment 156 inserted within the respective channels 112, 59. Rotation of the coupling portion 70 of the coupling member 50 causes rotation of the complementary coupling portion 16 in the motor protection circuit breaker 10 to selectively turn the motor protection circuit breaker either on or off.

In the second position, illustrated in FIG. 12, the locking lever 150 is disengaged from the upper sleeve 30 and the coupling member 50. As a result, a rotational force applied to the upper sleeve 30 simply causes rotation of the upper sleeve 30. The first spring seat 48 of the upper sleeve is generally planar and may rotate over the first end 122 of the spring 120. Similarly, the retaining lip 60 of the upper sleeve 30 and the retaining surface 37 of the coupling member 50 are generally planar and may rotate with respect to each other. As a result, when the locking lever 150 is disengaged from the upper sleeve and the coupling member 50 and a rotational force is applied to the upper sleeve 30, the upper sleeve simply rotates with respect to the other members of the door handle coupler 20 and no force is transferred down to the lower sleeve 90 or to the motor protection circuit breaker 10 on which the door handle coupler is mounted.

In the second position, the locking lever 150 also allows the door handle coupler 20 to be oriented with the door activator, if required. As discussed above, the door activator may require a particular orientation with respect to the door of the enclosure. Similarly, the motor protection circuit breaker may require mounting in a vertical or horizontal orientation according to a mounting rail, such as DIN rail, located within the enclosure. The axle extending between the door activator and the door handle coupler 20 may also require mounting in a particular orientation and the door activator and door handle coupler may not both be mounted in an orientation which allows the axle to be properly inserted between the two devices.

Figure 19:
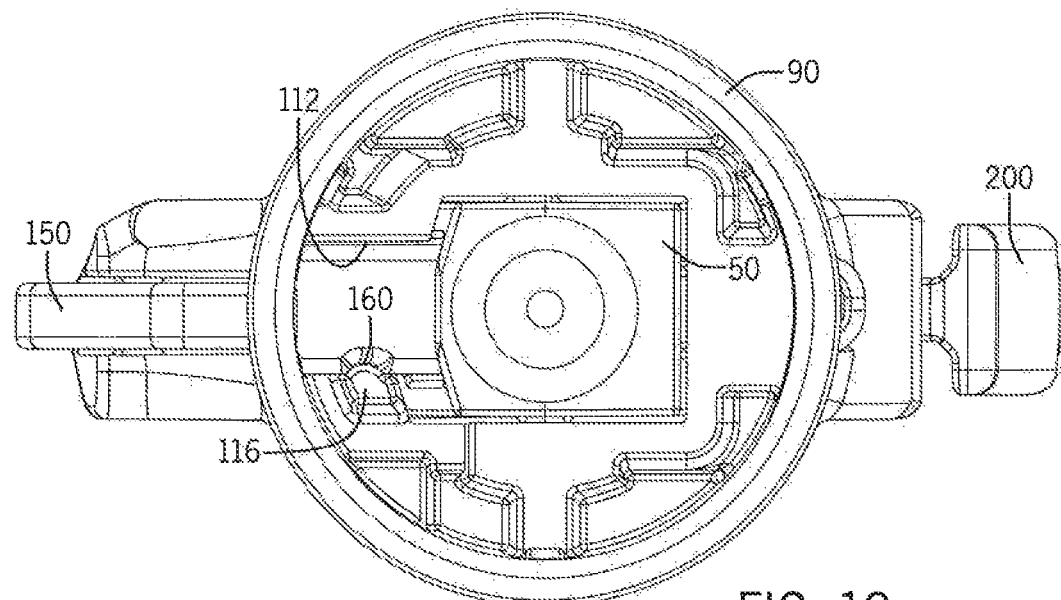
FIG. 19 is a partial top plan view of the door handle coupler of FIG. 1 with the upper sleeve and spring removed.
Figure 20:
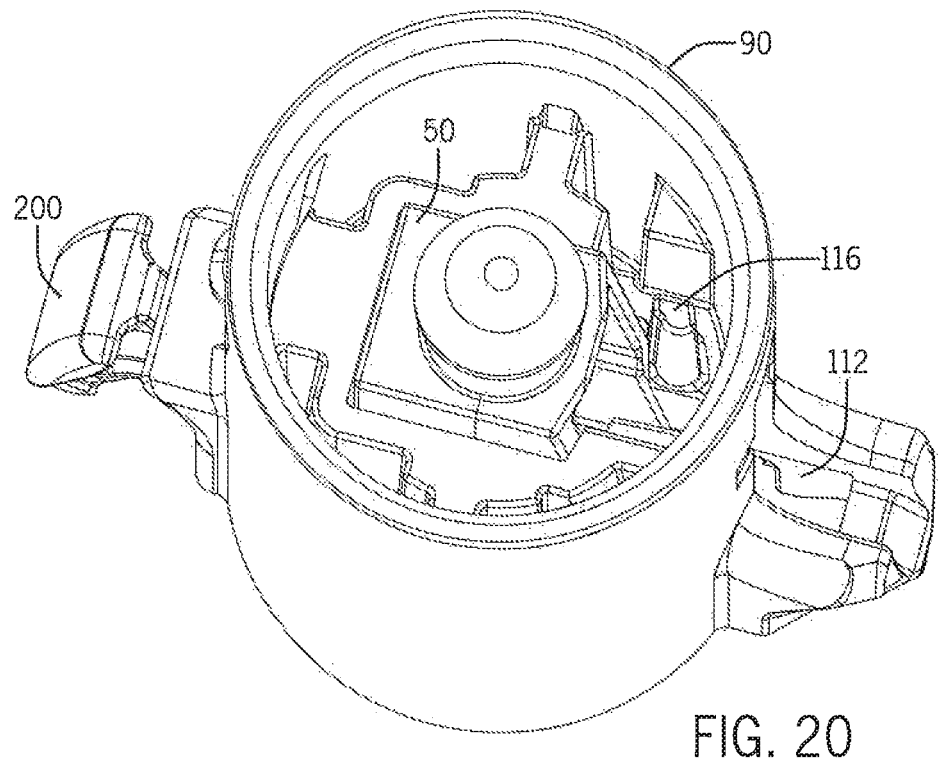
FIG. 20 is a partial perspective view of the door handle coupler of FIG. 19 with the locking lever removed.

With reference also to FIGS. 19 and 20, a retaining member 116 integrally formed with the lower sleeve 90 is used to keep the locking lever 150 in either the first or second position and to prevent the locking lever 150 from inadvertently pivoting from one position to the other. As best seen in FIG. 20, the retaining member 116 is a post-like structure extending upward within a cavity of the lower sleeve. The retaining member 116 is positioned adjacent to the channel 112 in which the locking lever 150 is pivotally moved within the lower sleeve 90. The post-like structure allows the retaining member 116 to initially be deflected away from the channel 112 as the locking lever 150 is pivoted between the first and second positions within the door handle coupler 20 and then to return to its original position when the locking lever 150 has reached the other position.

When the locking lever 150 is fully pivoted into the first position, a detent 160 along the side of the locking lever 150 aligns with the retaining member 116. The retaining member 160 is made of a resilient material and, therefore, when the locking lever is no longer deflecting it outward, the retaining member returns to its original position and engages the detent 160 of the locking lever 150. With the retaining member 160 positioned in the detent 160, the retaining member 160 creates an interference for the locking lever 150 from simply pivoting back out of the lower sleeve 90 to the second position. Vibration, for example, from equipment on which, or next to which, the enclosure containing the door handle coupler 20 is mounted will not cause the locking lever 150 to fall out of the coupler 20. Rather, a force applied by a technician intending to pivot the locking lever 150 between the first and second positions is required to again deflect the retaining member 116 outward as the locking lever pivots outward. FIG. 19 illustrates the locking lever 150 in the first position with the retaining member 116 engaging the detent 160.

Similarly, when the locking lever 150 is fully pivoted into the second position, the inner surface of the locking lever has pivoted outward, beyond the retaining member. The retaining member 116 has returned to its original position and creates interference with the locking lever 150 pivoting back into the lower sleeve 90. Either FIG. 17 or 18 may be referenced to see the locking lever 150 in the second position, where the lever is pivoted out of the sleeve and the inner surface of the locking lever is positioned outward from the retaining member 116. Once again, vibration would be insufficient to cause the locking lever 150 to pivot back into the lower sleeve 90. Rather, a technician must apply a force to the locking lever 150 to pivot the lever between the two positions, where in either direction, the retaining member 116 is first deflected outward from the lever as the lever pivots and then returns to its original position to hold the locking lever 150 in position upon completion of the move.

Figure 17:
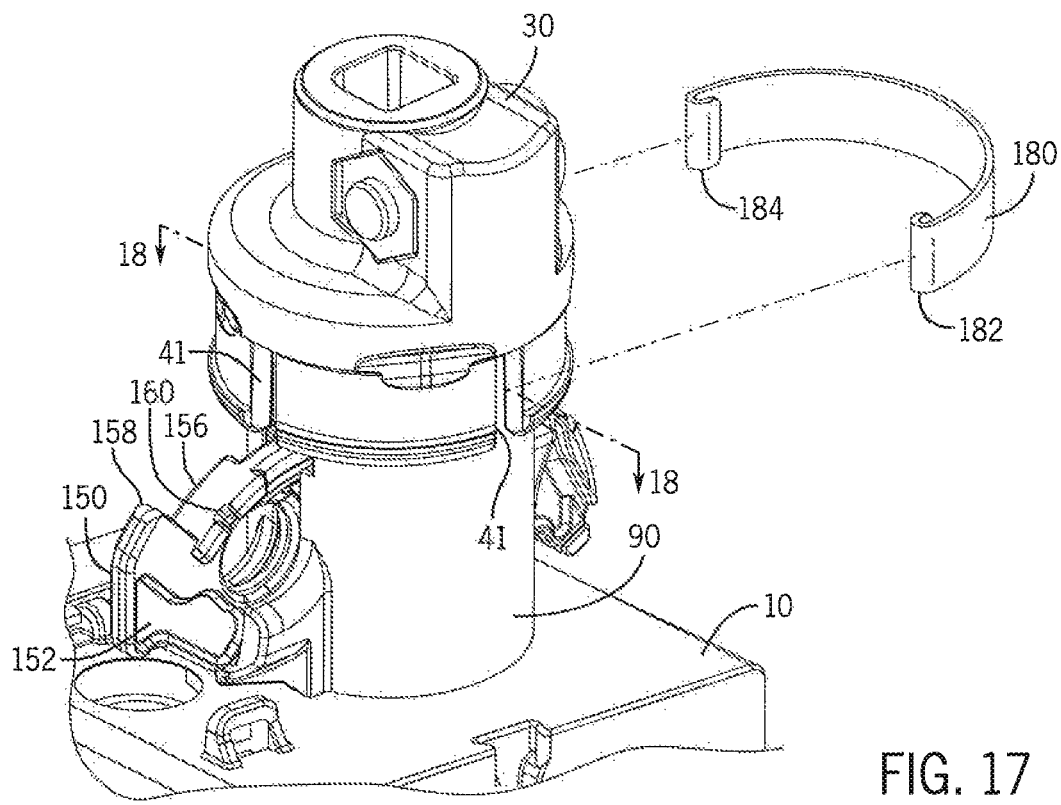
FIG. 17 is a partial perspective view of the exemplary motor protection circuit breaker with a door handle coupler according to one embodiment of the invention with an alignment band shown removed.

With reference to FIG. 17, an alignment band 180 is located around the lower portion of the upper sleeve 30. The alignment band 180 has a first end 182 and a second end 184, where each end is rolled under, forming a tab insertable into one of the orientation channels 41 located around the upper sleeve 30. A first orientation channel 41 defines a default orientation of the upper sleeve 30. Second and third orientation channels 41 are each displaced ninety degrees from the first orientation channel around the outer periphery of the upper sleeve 30 and are configured to receive the tabs formed on each end 182, 184 of the alignment band 180. The alignment band 180 fills the additional orientation channels 41 such that a single orientation channel is open and available to receive the upper segment 158 of the locking lever 150.

Figure 18:
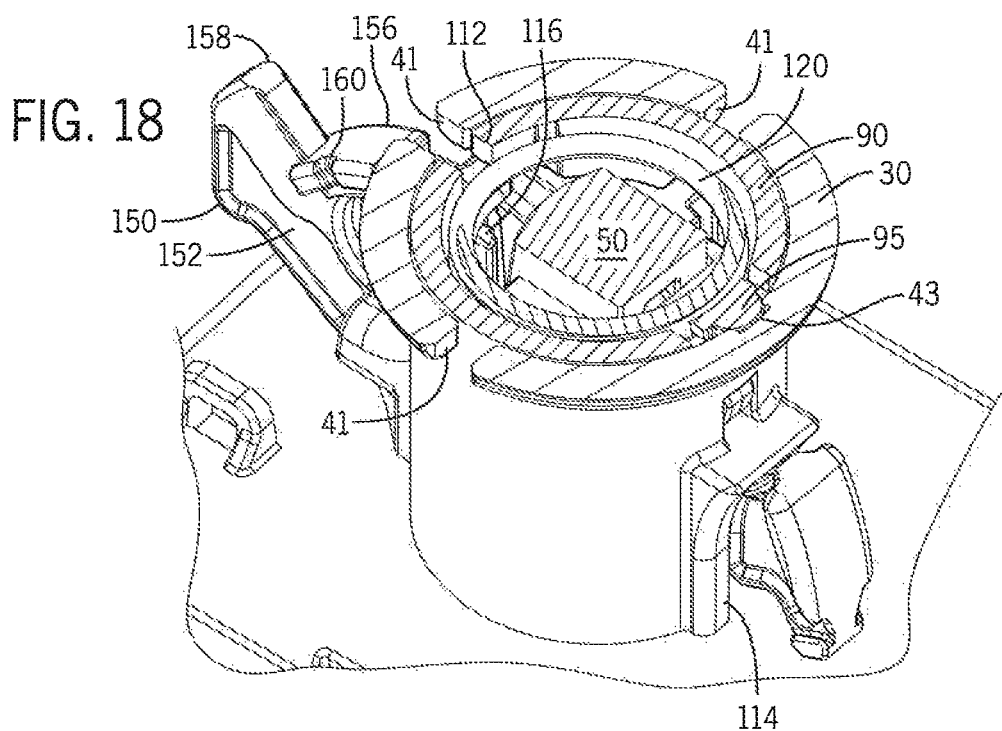
FIG. 18 is a sectional view of the door handle coupler of FIG. 17 taken at 18-18.

To prevent inadvertent rotation of the upper sleeve 30 with respect to the lower sleeve 90 when the locking lever 150 is not inserted into one of the orientation channels 41, the inner periphery of the upper sleeve 30 includes a retention slot 43 extending through a portion of the thickness of the upper sleeve 30 as shown in FIG. 18. Optionally, the retention slot 43 may be replaced by a fourth orientation channel 41 displaced one hundred eighty degrees around the outer periphery of the upper sleeve 30 from the first orientation channel. An alignment tab 95 protrudes from an outer periphery of the lower sleeve 90 along the upper portion of the lower sleeve which is inserted within the upper sleeve. The alignment tab 95 protrudes into the retention slot 43 to prevent inadvertent rotation of the upper sleeve 30 with respect to the lower sleeve 90. The alignment tab 95 has rounded edges and may be deflected inward as the upper sleeve 30 is rotated with respect to the lower sleeve 90. The rounded edges assist with displacing the tab 95 inward as the upper sleeve 30 rotates rather than catching against the side of the retention slot 43. When the upper sleeve 30 has rotated ninety degrees, the alignment tab 95 reaches one of the orientation channels 41. The alignment tab 95 is resilient and returns to its original position when reaching one of the orientation channels 41 such that it now protrudes within one of the orientation channels 41 and again prevents inadvertent rotation of the upper sleeve 30 with respect to the lower sleeve 90 when the locking lever 150 is not inserted into one of the orientation channels 41.

If the orientation of the door handle coupler 20 needs to be adjusted with respect to the door activator, the alignment band 180 may be removed from the upper sleeve 30, exposing the additional orientation channels 41. The shaft connecting the door handle coupler 20 to the door activator may be removed from either the door handle coupler 20 or from the door activator. The locking lever 150 is pivoted out to the second position and the upper sleeve 30 is then rotated in the appropriate direction to achieve the desired orientation. The alignment tab 95 on the lower sleeve 90 will engage either the retention slot 43 or one of the other orientation channels 41 to prevent further inadvertent rotation with respect to the upper sleeve 30. The locking lever 150 may be reinserted into the new orientation channel 41 and the shaft connecting the door handle coupler 20 to the door activator may be reconnected such that the door activator, shaft, and door handle coupler are all in the desired orientation.

With reference again to FIGS. 11 and 12, the door handle coupler 20 is configured to provide a local lock out of the motor protection circuit breaker 10. The locking lever 150 includes a lock out opening 154 extending through the locking lever. In the first position, illustrated in FIG. 11, the lock out opening 154 is positioned primarily internal to the lower sleeve 90 and the coupling member 50 and is not accessible. In the second position, illustrated in FIG. 12, the lock out opening 154 is positioned primarily external to the lower sleeve 90 and the coupling member 50. In the second position, the hasp of a lock may be inserted through the lock out opening 154 and the lock closed. When the hasp of the lock is inserted through the lock out opening 154, the locking lever 150 is prevented from pivoting back from the second position to the first position. Because the upper sleeve 30 rotates freely with respect to the lower sleeve 90 and with respect to the coupling member 50 when the locking lever 150 is in the second position, rotation of the upper sleeve 30 or of the shaft extending from the upper sleeve cannot cause the door handle coupler 20 to turn on the motor protection circuit breaker 10. Thus, inserting a hasp of a lock through the lock out opening 154 when the locking lever 150 is in the second position, provides for a local lock out feature at the motor protection circuit breaker 10. The local lock out feature may be utilized instead of an external lock out of an enclosure when an external lock out feature is not available or as a redundant lock out feature even if an external lock out of the enclosure is available.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom", "side", "left", and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A coupler for a disconnect switch, the coupler comprising:
    a first member configured to mount to the disconnect switch, the first member further comprising a first coupling portion configured to directly engage a complementary coupling portion on the disconnect switch to positively retain the coupler to the disconnect switch without using a tool;
    a second member configured to receive a shaft, the second member further comprising a channel into which the shaft is inserted, wherein the shaft is configured to transfer a rotational force applied to the shaft to the second member when inserted in the channel; and
    a force transfer member selectively connected between the first member and the second member, wherein:
    the force transfer member is operative to move between a first position and a second position,
    when the force transfer member is in the first position, the force transfer member transfers the rotational force from the second member to the first member, and
    when the force transfer member is in the second position, the force transfer member does not transfer the rotational force from the second member to the first member.

2. The coupler of claim 1 further comprising a third member rotatably mounted to the second member via the first member, wherein:
    the force transfer member is pivotally connected to either the second member or the third member, and
    the force transfer member is pivotally moved between the first position and the second position.

3. The coupler of claim 2 wherein when the force transfer member is in the second position, the second member rotates with respect to the third member as a result of the rotational force.

4. The coupler of claim 2 wherein:
the force transfer member includes a lock out opening,
the lock out opening is located, at least in part, within either the second member or the third member in the first position,
the lock out opening is located external from the second and third members in the second position,
the lock out opening is configured to receive a lock hasp extending through the lock out opening in the second position to prevent the lock lever from being pivotally moved back to the first position.

5. The coupler of claim 2 wherein:
the third member includes an opening in a bottom surface of the third member, and
the opening is configured to receive a rim protruding upward from the disconnect switch and extending around the complementary coupling on the disconnect switch.

6. The coupler of claim 5 further comprising a release lever pivotally mounted to the third member, wherein:
the release lever is pivotally moved between a first position and a second position,
the release lever engages the first member in the first position to draw the second member toward the third member, causing the first coupling portion to extend beyond the third member for engaging the complementary coupling portion,
the release lever disengages the first member in the second position, causing the opening in the third member to extend around the rim of the disconnect switch.

7. The coupler of claim 1 wherein the first coupling portion slidably engages the complementary coupling portion.

8. The coupler of claim 7 wherein:
the first coupling portion of the coupler is configured to be positioned within an opening on a surface of the disconnect switch and slid toward the complementary coupling portion to engage the first coupling portion with the complementary coupling portion, aligning the coupler over the opening.

9. The coupler of claim 1 wherein the first coupling portion is configured to disengage the complementary coupling portion to remove the coupler from the disconnect switch without using a tool.

10. A coupler for a disconnect switch mounted within an enclosure, the coupler comprising:
an upper sleeve configured to receive a first end of a shaft, wherein:
the upper sleeve includes a plurality of orientation channels, and
a second end of the shaft is configured to be connected to a door activator mounted on a door of the enclosure;
a lower sleeve configured to be mounted to a surface of the disconnect switch, wherein the upper sleeve is rotatably mounted to the lower sleeve; and
a locking lever pivotally mounted to the lower sleeve, wherein:
the locking lever is pivotally moved between a first position and a second position,
the locking lever includes an upper segment,
the upper segment is configured to be inserted into one of the plurality of orientation channels when the locking lever is in the first position, and
the upper segment is configured to be removed from each of the plurality of orientation channels when the locking lever is in the second position.

11. The coupler of claim 10 wherein the lower sleeve further comprises an alignment tab configured to engage either a retention slot or one of the plurality of orientation channels located in the upper sleeve, wherein the alignment tab resists rotation of the upper sleeve with respect to the lower sleeve when it is engaging the retention slot or one of the plurality of orientation channels.

12. The coupler of claim 10 further comprising a coupling member inserted within the lower sleeve, the coupling member including a first coupling portion configured to engage a complementary coupling portion on the disconnect switch to positively retain the coupler to the disconnect switch without using a tool.

13. The coupler of claim 12 wherein the first coupling portion slidably engages the complementary coupling portion.

14. The coupler of claim 12 wherein the locking lever engages the coupling member in the first position such that, when a rotational force is applied to the upper sleeve, the locking lever transfers the rotational force between the upper sleeve and the coupling member.

15. The coupler of claim 14 wherein:
the locking lever includes a lock out opening,
the lock out opening is located, at least in part, within either the upper sleeve or the lower sleeve in the first position,
the lock out opening is located external from the upper and lower sleeves in the second position,
the lock out opening is configured to receive a lock hasp extending through the lock out opening in the second position to prevent the lock lever from being pivotally moved back to the first position.

16. The coupler of claim 12 further comprising a spring mounted within the coupler between the upper sleeve and the lower sleeve, wherein:
the coupling member positively retains the upper sleeve to the lower sleeve and maintains partial compression of the spring between the upper sleeve and the lower sleeve.

17. The coupler of claim 12 wherein:
the lower sleeve includes an opening in a bottom surface of the lower sleeve, and
the opening is configured to receive a rim protruding upward from the disconnect switch and extending around the complementary coupling on the disconnect switch.

18. The coupler of claim 17 further comprising a release lever pivotally mounted to the lower sleeve, wherein:
the release lever is pivotally moved between a first position and a second position,
the release lever engages the coupling member in the first position to draw the upper sleeve toward the lower sleeve, causing the first coupling portion to extend beyond the lower sleeve for engaging the complementary coupling portion,
the release lever disengages the coupling member in the second position, causing the opening in the lower sleeve to extend around the rim of the disconnect switch.

19. A coupler for a disconnect switch mounted within an enclosure, the coupler comprising:

a first member configured to directly mount to the disconnect switch;
a second member configured to receive a first end of a shaft, wherein:
   a second end of the shaft is configured to be connected to a door activator mounted on a door of the enclosure, and
   the second member is configured to receive a rotational force applied to the door activator and transferred from the door activator to the second member via the shaft when the shaft is connected between the door activator and the second member; and
a force transfer member selectively connected between the first member and the second member, wherein:
   the force transfer member is configured to transfer the rotational force from the second member to the first member when connected between the first member and the second member,
   the force transfer member does not transfer the rotational force from the second member to the first member when not connected between the first member and the second member,
   the force transfer member includes a lock out opening accessible when the force transfer member is not connected between the first and second members, and
   the lock out opening is configured to receive a lock hasp extending through the lock out opening to prevent the force transfer member from being connected between the first and second members.

20. The coupler of claim 19 wherein the first member includes a first coupling portion configured to directly engage a complementary coupling portion on the disconnect switch to positively retain the coupler to the disconnect switch without using a tool.

* * * * *